Patented July 13, 1937

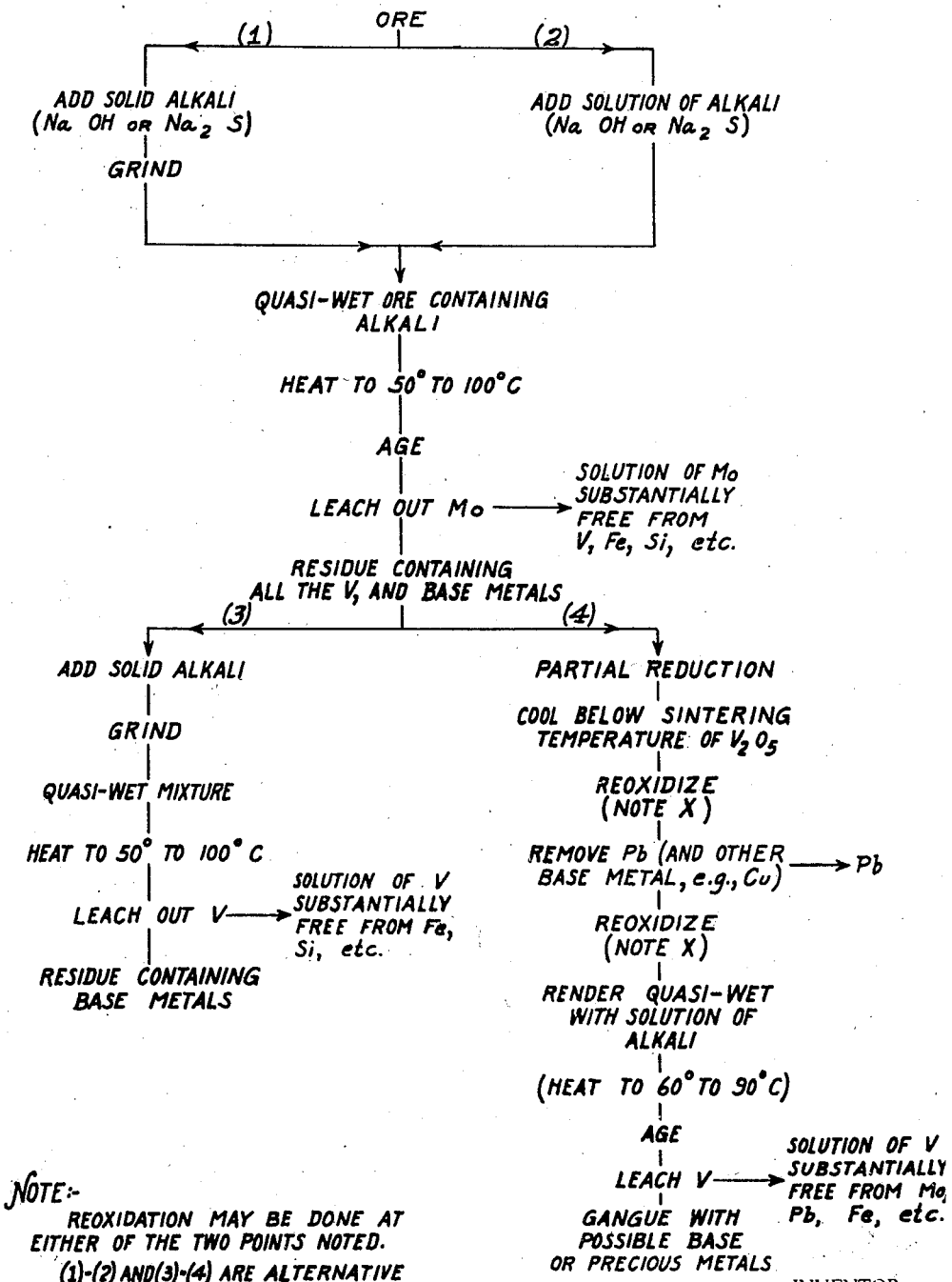

2,086,570

UNITED STATES PATENT OFFICE 2,086,570

METALLURGICAL PROCESS

Ralph F. Meyer, Freeport, Pa., assignor to Meyer Mineral Separation Company, Pittsburgh, Pa., a corporation of Delaware Application June 29, 1935, Serial No. 29,113

15 Claims. (Cl. 23—24)

This invention relates to treatment of ores to recover their metal values, and more particularly to the treatment of ores containing, in addition to base metals, one or more of the ferro-alloy metals, such as molybdenum and vanadium.

The method provided by this invention is applicable not only to the treatment of ores, but also to the treatment of concentrates and other materials containing metal values which are available for treatment by metallurgical methods. For brevity of reference all such materials are contemplated by the term "ore materials" as used herein.

It is a major object of this invention to provide a method of treating ores and ore materials to recover ferro-alloy metals contained in them, which provides for recovery of the ferro-alloy metal in pure form substantially uncontaminated by base metal, is simple, easily performed, highly efficient, economical, affords excellent separation of ferro-alloy metal from other metals contained in the ore material, such as base and precious metals, and is efficient and more economical than the procedures heretofore applied commercially to these ends.

A special object of the invention is to provide a simple, highly efficient and relatively inexpensive method of separating molybdenum in a state of high purity from ore materials containing it, and particularly to recover molybdenum and vanadium separately and in a state of purity such as to avoid disadvantages heretofore encountered in the art. Other objects of the invention will appear to those skilled in the art, from the following description.

The recovery of the ferro-alloy metals from their ore materials has been attended heretofore by various disadvantageous features. A particular difficulty that has been encountered is that the processes of recovering these metals, such as molybdenum and vanadium, for example, have been relatively expensive owing to the cost of large amounts of reagents, power and other attendant costs, and the difficult separations which previously have not been economically avoidable. For example, those procedures have been disadvantageous because of complications involved in separating and recovering in commercially pure forms the individual ferro-alloy metals, which have been removed concurrently from the ore. Commonly also the leach solutions are contaminated by base metals, wherefore such impure solutions have necessarily had to be purified before separating and extracting the ferro-alloy metals in pure forms, which has increased the difficulties and operating costs.

In a copending application, Serial No. 737,239, filed July 27, 1934, I have disclosed and claimed an improved procedure of recovering ferro-alloy metals from ore materials. According to that process the material is subjected to a partial reduction treatment, cooled in an inert atmosphere to a temperature below the sintering point of the normal oxides of the ferro-alloy metals which are present, and then treated to recover metal values. Preferably, base metals, especially lead, are separated first, after which the ferro-alloy metals are recovered, as by chloridizing, or, most suitably, the residue is reoxidized and the ferro-alloy metals recovered by alkali or acid reagents, or by flotation.

That procedure constitutes a major advance in the art because it results in substantial economies as compared with prior practice. Where a single ferro-alloy metal is present no difficulties are encountered in its recovery, but commonly some of these ores contain more than one ferro-alloy metal. For instance, many molybdenum ores found in this country contain vanadium. The procedure disclosed in my aforesaid application may render the ferro-alloy metals concurrently soluble in the same reagents, so that although it is a distinct advance in the art, separation of the ferro-alloy metals may still be necessary.

The present invention, on the other hand, provides, by a simple modification of the process of my aforesaid copending application, a clean and efficient separation of, for example, molybdenum and vanadium, so that the difficulty just mentioned is wholly avoided while retaining the benefits flowing from that process.

The present invention is predicated in part upon my discovery that molybdenum may be recovered directly (i. e., without preliminary treatment, such as partial reduction) and separately from other metals contained in molybdenum-bearing ore materials by treating the ore material with an alkali, such as sodium hydroxide, in the presence of definitely restricted amounts of water, and subsequently leaching the ore material to extract the molybdenum therefrom. In other words, I have found that by the combined use of (1) an alkali and (2) moisture in an amount not exceeding that which renders the material quasi-wet, the molybdenum can be preferentially solubilized so that the preponderant amount of it can be recovered in a quite pure form.

The term "quasi-wet" as used herein applies to a special condition of moistness of an ore material, in which state the material contains liquid, such as water, in an amount sufficient to moisten the individual ore particles adequately for the reactions to proceed satisfactorily, but in an amount insufficient to provide free movable liquid between the interstices of the ore particles. In the quasi-wet condition the volume of the ore increases as compared with an ore which is dry, and as compared with ore containing excess (free) liquid, and this volume increase may be very substantial. The ore in such a condition is in an optimum condition for reagent attack because it is characteristic of quasi-wet ore that it is of loose and open structure particularly adapted to rapid attack of reagents, especially gaseous reagents, whereby rapid and far-reaching effect of both gaseous and liquid reagents is produced. Furthermore a concentrated reagent solution may be used with greater benefit. These same factors render the ore in excellent condition for leaching. As further characteristics of the quasi-wet condition, such ore is not appreciably moist to sight or touch, it requires considerable hand pressure to compact it, but the compacted lump crumbles easily again. And the quasi-wet condition avoids interfering or troublesome reactions which may occur if liquid is present in excess of the quasi-wet state, i. e. if the ore is in the form of a pulp or a slime.

The amount of liquid required to produce the quasi-wet condition varies with different ore materials and with their degree of sub-division but it is readily ascertainable by observation in any particular instance owing to the fact that the ore volume increases over that of the ore prior to addition of liquid, and the volume of quasi-wet ore exceeds that of the ore when excess of liquid (free or movable liquid) is present, and further by the fact that free liquid between the interstices is not present. The term as applied herein contemplates the use of very small amounts, especially in a particular embodiment presently to be described, but here, too, the quasi-wet characteristics described are present and recognizable.

The present invention is predicated, therefore, upon the cooperative action of alkali and the quasi-wet state in solubilizing molybdenum while keeping base metals insoluble, so that it is recovered free from base metals, and, if desired, and as is now preferred, free, or substantially free, also from vanadium. Hence it may be said that the molybdenum is preferentially solubilized in the practice of this invention.

The attainment of the quasi-wet state may be accomplished in various ways as, for example, by mixing with the ore a sufficient amount of a solution of sodium hydroxide of appropriate NaOH concentration to provide enough alkali to solubilize the molybdenum and to bring the ore to the quasi-wet state. Preferably, relatively concentrated solutions of alkali are used because in general the use of concentrated solutions provides more efficient action, especially as regards separation of molybdenum in a state quite free from base metals.

Or, solid alkali may be mixed with the material and sufficient water to produce quasi-wetness added thereafter as liquid or steam. Most advantageously, however, the ore is ground with the solid alkali and the material permitted to absorb moisture, by exposure to air or steam, due to the pronounced tendency of caustic soda to abstract moisture from the atmosphere. The amount of water thus absorbed is not great but it suffices to produce a quasi-wet condition adequate for the purposes of this invention.

Various alkalies may be used in the practice of the invention, advantageously those of the alkali metals, and most suitably the alkali hydroxides and sulfides which for ease of reference are referred to in the claims as "suitable" alkali compounds, but the most efficient results are obtained with the alkali metal hydroxides. That is, larger amounts of sulfide are needed than where hydroxide is used and so it is usually more economical to use the hydroxide. For many purposes solutions of sodium hydroxide are preferred because of their cheapness and because of their efficiency in action. The solution is, of course, used in an amount adapted to produce the quasi-wet state and at the same time to provide sufficient alkali to solubilize the molybdenum. A reasonable excess of NaOH does no harm provided the quasi-wet state is maintained. Where solid alkali is used it may be added in any convenient form, such as the stick or flake forms of commerce. Such substances as sodium carbonate and ammonium carbonate do not in general lead to results as satisfactory as those had, using for example, sodium hydroxide.

For the best results the ore should be finely ground, say to 80 to 100-mesh, although in general the more finely the ore is ground the better the results will be. Where alkali solution is used the ore should be in finely ground condition prior to adding the solution, but where solid alkali is added to dry ore it is desirable to add it to coarse ore and grind the two in a mill to convert the ore to the desired finely ground condition and intimately mix the ore and alkali. Such use of dry, or solid, alkali with grinding is very desirable in many instances for reasons more fully developed hereinafter.

An application of heat, suitably by heating the quasi-wet ore, or the ore and solid alkali during grinding, to 50° to 100° C. or higher, preferably from about 60° to 90° C., is of considerable benefit in effecting the desired result.

Advantageously also the quasi-wet mixture of ore material and alkali is aged for a period of time, prior to leaching, to complete, if need be, the reactions involved in solubilizing the molybdenum, but more particularly to effect desolubilizing of the base metals. While not absolutely necessary it is of particular benefit to conduct such a heating and aging step in the presence of an oxidizing atmosphere, such as air, either by contacting the material with air, by passing air through it, or by agitating it in air. This causes desolubilizing of the base metals to be accelerated.

This aging is particularly important where it is wished to recover the molybdenum separately from the vanadium. After heating the quasi-wet ore substantially all of the molybdenum is soluble, and part of the vanadium is also soluble. While the two can be recovered simultaneously in a leach solution virtually free from base metals and impurities, it is desirable for most purposes that they be recovered separately. The aging step completely desolubilizes the vanadium without affecting the molybdenum solubility, affording complete separation of the two. The vanadium may be recovered in pure forms by procedures presently to be described.

Where quasi-wetness is reached by an alkali solution the maintenance of the quasi-wet condition and the heating of the ore may be combined by treating the ore with steam, which supplies the heat desired together with sufficient moisture to efficiently maintain the quasi-wet state. Air may be added simultaneously. Such a step may be combined with agitation, if desired.

In the practice of the invention as thus described it is possible to solubilize substantially all of the molybdenum and to separate it from any vanadium and other metals contained in the ore. Upon leaching the treated ore there is obtained a practically pure solution of molybdenum, apparently as sodium molybdate, containing, at most, traces of iron, zinc, arsenic, silica, lead, phosphorus and other impurities which commonly attend these ores.

*Example 1.*—As an example of the practice of the invention, and of the benefits which attend it, reference may be made to the treatment of a concentrate containing about 6.66 per cent of molybdenum oxide, $MoO_3$, 6.72 per cent of vanadium oxide, $V_2O_5$, 16 per cent of zinc, about 28 per cent of lead, 0.64 per cent of copper, 0.6 per cent of aluminum calculated as $Al_2O_3$, 23.55 per cent of iron calculated as $Fe_2O_3$, 16.5 per cent of silica, and 1.76 per cent of calcium calculated as $CaO$. The concentrate was ground to about 100-mesh, and the ground material was treated with a 40 per cent water solution of sodium hydroxide, sufficient solution being used to provide the ore with about 6 per cent of sodium hydroxide. This amount of solution rendered the ore quasi-wet, and provided sufficient alkali for the purposes of the invention. The alkali solution was added gradually to the ore while agitating and heating it. The mixture was heated 30 minutes at about 90° C., and this caused both the molybdenum and a part of the vanadium to be solubilized. The vanadium was desolubilized by then aging for 24 hours at room temperature and in contact with air. At the end of that time the material was leached with water. The leach solution contained 99.2 per cent of the molybdenum present in the ore. The solution contained no vanadium, lead or silica, and only mere traces of iron and zinc were present.

As evidencing the fact that the step of restricting wetting to that sufficient to produce the quasi-wet state is an important factor in the invention, reference may be made likewise to other tests in which excess of liquid was used in treating other portions of the ore just referred to.

*Example 2.*—In one such test the ore was digested 1 hour at 90° C. in a 20 per cent solution of sodium hydroxide, there being used one part of ore to one part of solution. The molybdenum recovery was substantially that effected in Example 1, but the leach solution contained 7.52 per cent of lead, a large amount of zinc, and some silica. Such amounts of lead, silica and zinc render the solution quite foul, and obviously they render the recovery of the molybdenum more difficult and expensive, and may make it difficult economically to obtain the molybdenum satisfactorily in pure form.

Similar results were obtained using more dilute solutions of sodium hydroxide, and also using smaller amounts of solution, although still in an amount sufficient to provide excess of liquid.

*Example 3.*—In another test a further amount of the same ore was mixed with a 10 per cent solution of sodium hydroxide in the proportion of one part of ore to 0.6 part of solution, thus providing excess of liquid over that necessary to produce the quasi-wet state. The material was digested 1 hour at 90° C. The slurry was then dried to a quasi-wet state, following which it was heated and agitated for 30 minutes while maintaining it quasi-wet, and then it was aged 24 hours, just as described in connection with Example 1. When the material was leached the results were practically the same as obtained in connection with Example 1, from which it appears that the use of the quasi-wet state in accordance with this invention provides its beneficial results even though there may initially have been present an excess of solution.

*Example 4.*—In still another test a further portion of the ore was digested 1 hour with a 10 per cent water solution of sodium hydroxide, using one part of ore to 0.6 part of caustic soda solution, as in Example 3. This treatment solubilized only about 60 per cent of the molybdenum, and the solution contained also 1.7 per cent of soluble lead, together with some zinc and silica.

A comparison of Examples 3 and 4 is illustrative of the benefits of this invention. Example 4 represents the prior art methods of using excess of liquid. It resulted in incomplete extraction of the molybdenum and in the production of an impure solution. Example 3, in which the same amounts of the same materials were used as in Example 4, but in which the quasi-wet state was produced, afforded substantially complete extraction of the molybdenum in the form of a very pure solution. Thus the benefit of the quasi-wet method which characterizes this invention will be clear from the increased extraction in purer solution and with the use of decreased amounts of reagent.

If preferred, the vanadium may be removed in good yield and in pure form by applying the process of the invention to the molybdenum-free residue obtained as described hereinabove. That is, after the molybdenum has been removed, the residue is treated with alkali in the quasi-wet state, applying heat, as described, followed by leaching. It is particularly advantageous to make use of the embodiment in which solid alkali is ground with the dry ore, especially because the vanadium can be removed thus without preliminary removal of the base metals which, just as in removal of the molybdenum, remain insoluble. In general a rather large excess of alkali, about 200 to 400 per cent of that theoretically needed to combine with the vanadium, is needed where caustic soda is used.

The ore is dried after leaching the molybdenum, the solid alkali, sodium hydroxide, preferably is added and the two are ground. The ground material is made quasi-wet, as by exposing it to moist air or steam, and the quasi-wet ore is then heated for a period, for example as in Example 6, cooled and either leached immediately, or aged to desolubilize impurities. The ore described in Example 1 was treated in this manner with recovery of 94 per cent of its vanadium content in pure solution.

With a rather large excess of alkali present in the quasi-wet state the vanadium remains soluble upon aging and the impurities are more completely desolubilized.

The addition of solid alkali to the ore, with subsequent grinding, is a desirable procedure, and it is of importance particularly where excess of alkali is used, as in removing vanadium. For instance, if a particular ore requires 30 per cent of sodium hydroxide for extraction of its vanadium content, a sticky and difficultly workable mass would result if the alkali were added in the form of a solution. But by adding solid alkali to the ore (and drying, if necessary) and grinding the mixture excellent results are had, all such difficulties as that mentioned being removed; thereafter the necessary moistening takes place automatically by merely exposing the ground mixture to air or steam, and, surprisingly, gumminess and stickiness are not encountered thereafter.

It appears, therefore, that by the simple procedure provided by the invention molybdenum and vanadium are recoverable separately, with excellent efficiency, and in forms, as in leach solutions, quite free from other metals. By using moderate amounts of alkali and the quasi-wet state the molybdenum can be preferentially solubilized, and thereafter by using a large excess of alkali and the quasi-wet state the vanadium can be solubilized. The large excess of alkali may be added as a solution and good results obtained but many mechanical difficulties are encountered.

Although the invention has been described thus far with reference to treatment of ores containing molybdenum, or molybdenum and vanadium, it will be understood from the foregoing description that the process provided by the invention is applicable equally to ores containing vanadium but no molybdenum.

*Example 5.*—A portion of the same ore, about 40 to 60-mesh grain size, was heated to 80° C. and to it there was added 27 per cent of solid caustic soda in stick form. The mixture was ground during 20 minutes to about 150-mesh, the mill being kept at a temperature of about 120° C. After cooling it was leached with water thus extracting 75 per cent of the molybdenum and 50 per cent of the vanadium in a solution substantially free from silica, lead and iron, and containing but 0.25 per cent of lead, and 0.3 per cent of zinc.

As noted hereinabove, a considerable excess of sodium hydroxide should ordinarily be used to solubilize the vanadium, as much as 200 to 400 per cent excess NaOH being desirable. When such excess sodium hydroxide is present, the dry ground and heated material will have about 75 per cent of its molybdenum content and 50 per cent of its vanadium content solubilized, as indicated by Example 5. Aging of the ore under such condition of excess alkali causes no material change in Mo and V solubility but it does assist in rendering base metals and impurities insoluble, more particularly when the material is quasi-wet.

*Example 6.*—Ground material the same as described in Example 5 was exposed to air until it had absorbed 5 per cent of moisture, and it was then heated 1 hour at 90° to 100° C., and a sample was leached immediately, which gave a solution containing 99 per cent of the molybdenum, 94 per cent of the vanadium, 0.09 per cent of silica, 0.11 per cent of lead, and 0.17 per cent of zinc. The remainder of the material was then aged 12 hours, after which the Mo and V solubilities were approximately the same as before aging, while mere traces of lead and silica were soluble, and but 0.11 per cent of zinc.

*Example 7.*—The same ore was treated to remove the molybdenum by mixing the coarse dry material with 6 per cent of flake NaOH, grinding to about 100-mesh, then moistening with 15 per cent of water, and heating 1 hour at 90° to 100° C., followed by aging 24 hours. Upon leaching substantially all of the molybdenum was extracted in a clean solution. The residue was dried and 30 per cent of granular NaOH was added to it. The mixture was ground to form an intimate mixture while heating the material to 120° to 150° C. About 50 per cent of the vanadium was then soluble together with very small amounts of Pb, Zn and SiO$_2$. The ground material was made quasi-wet with about 6 per cent of moisture and heated 1 hour at 90° to 100° C. and aged, with practically the same results as in Example 5. The dry ore can be ground cold, then made quasi-wet and heated with substantially the same result.

*Example 7—a.*—A part of the dry ground (after removal of Mo) ore containing NaOH described in Example 7 was mixed with 100 per cent by weight of water (A), and another part with 50 per cent by weight of water (B). Both portions were digested 1 hour at 85° to 90° C., the volume of the slurry being kept constant by additions of water. Both portions were filtered and the solubilities determined: Portion A (100% H$_2$O): 65 per cent of the vanadium was soluble together with 3 per cent of zinc, 1.5 per cent of lead, and 0.9 per cent of silica. Portion B: 65 to 70 per cent of the vanadium was soluble together with much more Pb, Zn and SiO$_2$, than in Portion A.

*Example 7—b.*—Two tests were made like Portions A and B of Example 7—a, but the digested slurries were dried to quasi-wetness and heated 1 hour at 90° to 100° C., and then aged. The results obtained were equivalent to those obtained in Example 7.

It appears, therefore, that by dry grinding the ore and NaOH together with heat, about 75 per cent of the Mo and 50 per cent of the V can be solubilized provided sufficient NaOH be present; by quasi-wetting the material substantially all the Mo and V can be solubilized. Or, by using less NaOH the Mo can be selectively solubilized, then the V can be solubilized by treating the residue with more NaOH. The excess NaOH over that needed to solubilize the V can be recovered by crystallizing out the sodium vanadate and evaporating the mother liquor to dryness and reusing the resultant NaOH.

It thus appears that the invention does not reside alone in the use of an alkali solution, but that the quasi-wet state constitutes a critical factor which makes possible clean separation of the molybdenum and vanadium from the other metals. The exact mechanism is not fully understood, and while I do not limit myself to this explanation, it appears probable that in treating ores of the type contemplated with alkali in the quasi-wet way, the formation of soluble sodium plumbates, zincates, silicates, and other complex metal compounds, is avoided due to hydrolysis and reprecipitation of these salts to form insoluble compounds. It is probable that it is for these reasons that it is advantageous to age the ore in air, which assists in and hastens the hydrolyzing phenomena, although continued access of air is not necessary during aging. Moreover molybdenum appears to have a greater affinity for alkali than the other metals, so that it is preferentially solubilized.

Having removed the molybdenum it may be recovered as desired from the leach solution, this being uncomplicated by the necessity for separating it from other metals because of the purity of the solution.

The residue remaining after molybdenum extraction may then be worked up to recover other metal values. I have found that vanadium or other ferro-alloy metals, when present, may be recovered by treating the residue in accordance with the process disclosed in my copending application Serial No. 737,239, referred to hereinabove, and various details and modifications of this step will now be described.

Assuming vanadium to be present, the leached residue is subjected to a partial reduction, as by mixing it with a solid reducing agent, heating the mixture and effecting partial reduction of ore constituents, and then cooling in a non-oxidizing, or inert, atmosphere to normal temperature, or at least to a temperature below the sintering temperature of the normal oxide of vanadium ($V_2O_5$).

In the practice of this step the ore residue (after removal of molybdenum) is intimately mixed with an appropriate amount of solid reducing agent, e. g., a carbonaceous reducing agent, advantageously coal. It is advantageous to grind them together, for not only does this effect the desired intimate commingling, but also it is desirable to have the ore ground. The mixture is then heated to effect partial reduction of ore constituents, and thereby to break up the refractory complexes. In the case of most ores reduction may be effected suitably at temperatures of about 300° C. to about 900° C. With some ores a very short heating suffices, while others may require heating for several hours, say two or three. I have found that in such instances it usually suffices to bring the ore up to temperature and then give it a soaking treatment at temperature in a heat-insulated soaking chamber, or pit, for a suitable length of time, for example, one to three hours. The ore sufficiently retains its temperature to effect the desired reduction without the addition of heat during the soaking period.

If the ore becomes sintered the recovery of the metals, if not substantially precluded by the simple means characteristic of the invention, is certainly much less efficient. I have found also that to avoid such sintering the ore should be intimately mixed with the reducing agent prior to elevating its temperature. The particles of reducing agent apparently serve to hold the ore particles apart and prevent them from sintering. Also, the more intimately the reducing agent is mixed with the ore, the better is the reduction and breaking up of the refractory complexes. The effect of these factors is especially important in the case of ore materials high in easily fusible compounds of lead.

After reduction the ore is carefully cooled in an inert, or non-oxidizing atmosphere, such as the reducing atmosphere of the reduction step, to room temperature, or a temperature below the sintering temperature of the normal oxide of the ferro-alloy metal, or metals, concerned, for example, in the case of vanadium below about 658° C., the sintering temperature of its pentoxide. The sintering point is apparently much lower in the case of the normal oxides, so that the reduced ore should be carefully cooled in a non-oxidizing atmosphere to a lower temperature. The cooling should be continued to room temperature in contact with the inert atmosphere where the metal values are to be recovered by leaching or the like methods, but where the ore is to be reoxidized, as referred to hereinafter, before the base metals are removed it need be cooled only to a temperature suitable therefor with avoidance of sintering. For reoxidation most of the heat necessary may be supplied by the carbon left in the material after the partial reduction.

This partial reduction breaks down the mineral complexes and puts the metal values in a condition for easy recovery of them. Thus, as described in my copending application, the vanadium may be recovered by chloridizing, or it may be reoxidized to produce the normal oxide of vanadium, which may be leached with alkali or acid solutions, which affords a good recovery of the vanadium. Or, the quasi-wet alkali method may best be used to recover the vanadium. However, if base metals, especially lead, are present they should be removed before leaching with NaOH solution if clean vanadium solutions are desired. If they are not preliminarily removed the vanadium solutions will contain appreciable amounts of lead, zinc, silica, iron, copper, etc., depending on the reagent and conditions, which is undesirable.

The base metals, such as copper and lead, and other base metals when present, may be removed first, and this may be done by known methods. Advantageously it is accomplished by application of the quasi-wet principle disclosed in my earlier patents, among which are No. 1,833,682, No. 1,898,018, and others.

With ores containing lead it is desirable to remove it by a novel procedure which I have disclosed and claimed in my aforesaid copending application. According to that method the ore residue after reduction and cooling is rendered quasi-wet with a solution or vapor of acetic acid at a suitable temperature, and through such use of this reagent there is rapid conversion of the lead to acetate, which is easily soluble in water. This reagent renders the copper soluble also, but if the quasi-wet material be treated with only enough acetic acid to combine with the lead it is possible to leach the preponderance of the lead in substantially pure solution, and particularly to effect a relatively clean separation of the lead and copper.

The acetic acid may be regenerated and the lead recovered by gassing the strong lead acetate solution with sulfur dioxide, which causes the lead to be precipitated as lead sulfite, regenerating the acetic acid for further leaching. The lead sulfite may be worked up in various ways to convert it to other lead compounds, or it may be smelted to convert it to metallic lead, thus regenerating the sulfur dioxide for use in treating further lead acetate leach solutions.

If the reduced ore residue is treated with water vapor and acetic acid vapor at about 80–95° C. the ore remains fine and loose, and it does not become sticky, and the base metals can be completely solubilized in one operation if desired. Also, very dilute acetic acid may be thus utilized and the reduced material then acts as a scrubbing agent whereby the acetic acid combines with the metals and the excess of water vapor over that necessary to maintain the quasi-wet condition passes out of the reaction chamber. Due to the temperature of 80° to 95° C. the excess water is not permitted to condense into the ore and is therefore carried off completely separated from the acid. Of course, some amount of water will condense into the ore to quasi-wet it, this condition being controlled by the temperature.

The ore residue remaining after such lead separation is washed, dried and again rendered quasi-wet with acetic acid, following which it is aged for twenty-four hours in air. Thereafter it is leached with water, which removes copper together with a further amount of lead. By this treatment about 95 per cent of the lead and copper may be removed.

The ease and simplicity of this acetic acid procedure, and its rapidity are especially desirable, as is also the fact that by due precaution as to the amount of acetic acid used, a substantially pure solution of lead is obtained. Of course, if copper and the like are absent, the amount of acid used is less important. Low iron solubility results from restriction of the amount of acetic acid and from elevated temperature (80° to 95° C.), and this follows largely from quasi-wetting, which permits only restricted amounts of liquid. At a temperature of 80–95° C. practically no iron is solubilized. Any iron solubilized and in the ferric condition may be removed completely from lead acetate solution by merely boiling it.

Returning now to the recovery of vanadium, the reduced material, after removal of the lead and copper, is reoxidized at a temperature below the sintering or melting point of the normal oxide of vanadium.

Such a reoxidizing treatment may be effected by heating the reduced material in air to a temperature of about 400° or 500° C. If preferred for any reason this reoxidation may be performed before removal of base metals, instead of after their removal as described in the foregoing illustrative embodiment.

After reoxidation the ore is rendered quasi-wet with a solution of an alkali and treated as described hereinabove for the extraction of molybdenum. Here again the invention is characterized by production of clean vanadium solutions, with attendant benefits, and with recovery of the preponderant part of the vanadium present. Removal of lead is important to this end because otherwise the recovery is less efficient. The final residue is then treated in any desired manner for recovery of any further amounts of base and precious metals which may be present.

This application is a continuation in part of my copending application Serial No. 746,400, filed October 1, 1934.

According to the provisions of the patent statutes, I have explained the principle of my invention and described what I now consider to represent its best embodiment. However, I desire to have it understood that, within the scope of the appended claims, the invention may be practiced otherwise than as specifically described.

I claim:

1. That method of treating ore material containing a metal of the group molybdenum and vanadium, comprising the steps of introducing into the ore a suitable alkali in an amount sufficient to solubilize said metal and water in an amount sufficient to moisten the individual particles of the ore and produce an increase in ore volume as compared with dry ore, but such that free movable liquid is absent from the interstices between the particles, the thus moistened ore being of loose, open structure, not appreciably wet to sight or touch, requiring considerable hand pressure to compact it, and the compacted lump crumbling easily, thereby converting said metal to soluble form, and leaching the thereby solubilized metal from the treated ore.

2. That method of treating ore material containing metal of the group molybdenum and vanadium, comprising the steps of introducing into the ore a suitable alkali in an amount sufficient to solubilize said metal and water in an amount sufficient to moisten the individual particles of the ore and produce an increase in ore volume as compared with dry ore, but such that free movable liquid is absent from the interstices between the particles, the thus-moistened ore being of loose, open structure, not appreciably wet to sight or touch, requiring considerable hand pressure to compact it, and the compacted lump crumbling easily, heating the thus-moistened material and agitating it in contact with air, thereby converting the molybdenum to soluble form, cooling to normal temperature and allowing the material to stand for a period of time sufficient to desolubilize water-soluble vanadium, and leaching the solubilized molybdenum from the treated ore.

3. That method of treating ore materials containing molybdenum, comprising the steps of mixing with the material a solution of alkali metal compound in an amount to provide sufficient alkali to solubilize the molybdenum and water in an amount sufficient to moisten the individual particles of the ore and produce an increase in ore volume as compared with dry ore, but such that free movable liquid is absent from the interstices, the thus-moistened ore being of loose, open structure, not appreciably wet to sight or touch, requiring considerable hand pressure to compact it, and the compacted lump crumbling easily, treating the thus-moistened material with steam, and thereby converting the molybdenum to soluble form, and leaching the solubilized molybdenum from the treated ore.

4. In a process of treating ore materials to recover metal of the group molybdenum and vanadium, that combination of steps comprising grinding the dry ore material with a solid alkali in an amount sufficient to solubilize said metal and introducing into the mixture water in an amount sufficient to moisten the individual particles of the ore and produce an increase in ore volume as compared with dry ore, but such that free movable liquid is absent from the interstices, the thus-moistened ore being of loose, open structure, not appreciably wet to sight or touch, and requiring considerable hand pressure to compact it, and the compacted lump crumbling easily, heating the mixture to solubilize said metal and leaching the ore to recover said metal therefrom.

5. In a process of treating ore materials to recover metal values, that combination of steps comprising grinding the dry ore material with a solid alkali in an amount sufficient to solubilize the molybdenum contained in the ore and introducing into the mixture water in an amount sufficient to moisten the individual particles of the ore and produce an increase in ore volume as compared with dry ore, but such that free movable liquid is absent from the interstices, the thus-moistened ore being of loose, open structure, not appreciably wet to sight or touch, requiring considerable hand pressure to compact it, and the compacted lump crumbling easily, heating the mixture to solubilize molybdenum contained in the ore, cooling the mixture and allowing it to stand for a period of time sufficient to desolubilize ore constituents other than molybdenum, and leaching the ore to recover molybdenum therefrom.

6. In a process of treating ore materials to recover metal values, that combination of steps comprising mixing the ore material with a solution of a suitable alkali in an amount such as to provide sufficient alkali to solubilize molybdenum contained in the ore and to provide water in an amount sufficient to produce a condition in which the individual particles of the ore are moistened and the ore volume is increased as compared with dry ore, but free movable liquid is absent from the interstices, and the ore is of loose, open structure, not appreciably wet to sight or touch, requires considerable hand pressure to compact it, and the compacted lump crumbles easily, heating the mixture to solubilize molybdenum, cooling to normal temperature, holding the ore for a period of time sufficient to desolubilize water-soluble vanadium, leaching the ore to extract molybdenum, drying the leached ore and grinding it with an excess of a solid alkali, introducing into the dry and ground ore water in an amount sufficient to reproduce said condition, heating the mixture to solubilize vanadium, and leaching the vanadium from the ore.

7. That method of separately recovering molybdenum and vanadium from ore materials containing them, comprising mixing the finely divided ore with a solution of a suitable alkali in an amount such as to provide alkali sufficient to solubilize molybdenum and to provide water in an amount sufficient to produce a condition in which the individual particles of the ore are moistened and an increase in ore volume is produced as compared with dry ore, but free movable liquid is absent from the interstices, and the ore is of loose, open structure, not appreciably wet to sight or touch, requires considerable hand pressure to compact it, and the compacted lump crumbles easily, allowing the moistened ore to stand for a period of time sufficient to render insoluble ore constituents other than molybdenum, leaching the molybdenum from the ore, effecting partial reduction of ore constitutents in the leached residue, cooling under non-oxidizing conditions to a temperature below the sintering temperature of the normal oxide of vanadium, removing lead from the material, reoxidizing the vanadium, adding a solution of alkali metal compound to reproduce said condition, and leaching to recover said vanadium.

8. That method of separately recovering molybdenum and vanadium from ore materials containing them, comprising (1) introducing into the finely divided ore material a suitable alkali in an amount sufficient to solubilize molybdenum and liquid in an amount sufficient to produce a condition in which the individual particles of the ore are moistened and an increase in ore volume is produced as compared with dry ore, but free movable liquid is absent from the interstices, and the ore is of loose, open structure, not appreciably wet to sight or touch, requires considerable hand pressure to compact it, and the compacted lump crumbles easily, agitating the thus-moistened mixture in contact with air, and then leaching out the molybdenum; and (2) providing an intimate mixture of the leached residue with solid reducing agent, heating the mixture and effecting partial reduction of ore constituents, cooling under non-oxodizing conditions to a temperature below the sintering temperature of the normal oxide of vanadium, removing lead from the thus-treated ore, heating to reoxidize vanadium oxide, mixing with a solution of alkali metal compound in an amount to reproduce said condition, agitating the thus-moistened material in contact with air, and leaching the vanadium, the leach solutions being substantially free from base metals.

9. A process according to claim 7, said reoxidation being effected by heating the material in air to a temperature of about 400° to 500° C.

10. A process according to claim 7, the material being heated to about 60° to 90° C. in the molybdenum recovery step.

11. A process according to claim 8, the material being heated to about 60° to 90° C. in the molybdenum recovery step.

12. That method of treating ore material containing metal of the group molybdenum and vanadium, comprising the steps of introducing into the ore an alkali hydroxide in an amount sufficient to solubilize said metal and water in an amount sufficient to moisten the individual particles of the ore and produce an increase in ore volume as compared with dry ore, but such that free movable liquid is absent from the interstices between the particles, the thus-moistened ore being of loose, open structure, not appreciably wet to sight or touch, requiring considerable hand pressure to compact it, and the compacted lump crumbling easily, heating the thus-moistened material to a temperature sufficient to solubilize said metal while not solubilizing substantial amounts of other metals, and leaching the treated ore and thereby recovering said metal in solution substantially free from base metal.

13. That method of treating ore material containing metal of the group molybdenum and vanadium, comprising the steps of introducing into the ore an alkali hydroxide in an amount sufficient to solubilize said metal and water in an amount sufficient to moisten the individual particles of the ore and produce an increase in ore volume as compared with dry ore, but such that free movable liquid is absent from the interstices between the particles, the thus-moistened ore being of loose, open structure, not appreciably wet to sight or touch, requiring considerable hand pressure to compact it, and the compacted lump crumbling easily, heating the thus-moistened material and agitating it in contact with air for a period of time sufficient to convert said metal to soluble form and desolubilize other metals, and leaching the treated ore and thereby recovering said metal in substantially pure solution.

14. That method of treating ore material containing molybdenum and vanadium, comprising the steps of introducing into the ore an alkali hydroxide in an amount sufficient to solubilize the molybdenum and water in an amount sufficient to moisten the individual particles of the ore and produce an increase in ore volume as compared with dry ore, but such that free movable liquid is absent from the interstices between the particles, the thus-moistened ore being of loose, open structure, not appreciably wet to sight or touch, requiring considerable hand pressure to compact it, and the compacted lump crumbling easily, heating the moistened material to a temperature sufficient to convert the molybdenum to soluble form while not solubilizing substantial amounts of other metals, leaching the treated ore and recovering molybdenum in solution substantially free from vanadium and base metal, bringing the residue to the aforesaid moistened condition and adding alkali hydroxide in an amount in excess of that theoretically equivalent to the vanadium, heating the moistened ore, then leaching and recovering vanadium in solution substantially free from base metal.

15. That method of treating ore material containing metal of the group molybdenum and vanadium, comprising the steps of introducing into the ore and alkali hydroxide in a amount sufficient to solubilize said metal and water in an amount sufficient to moisten the individual particles of the ore and produce an increase in ore volume as compared with dry ore, but such that free movable liquid is absent from the interstices between the particles, the thus-moistened ore being of loose, open structure, not appreciably wet to sight or touch, requiring considerable hand pressure to compact it, and the compacted lump crumbling easily, thereby converting said metal to soluble form, leaching the treated ore and recovering said metal in solution substantially free from base metal.

RALPH F. MEYER.